Dec. 29, 1931.                G. MELAZZO                1,838,629
                    SYNCHRONOUS MOTOR DRIVEN CONVERTER
                    Filed Oct. 30, 1928      2 Sheets-Sheet 1

GIOVANNI MELAZZO
INVENTOR
BY
HIS ATTORNEY

Dec. 29, 1931.    G. MELAZZO    1,838,629
SYNCHRONOUS MOTOR DRIVEN CONVERTER
Filed Oct. 30, 1928    2 Sheets-Sheet 2
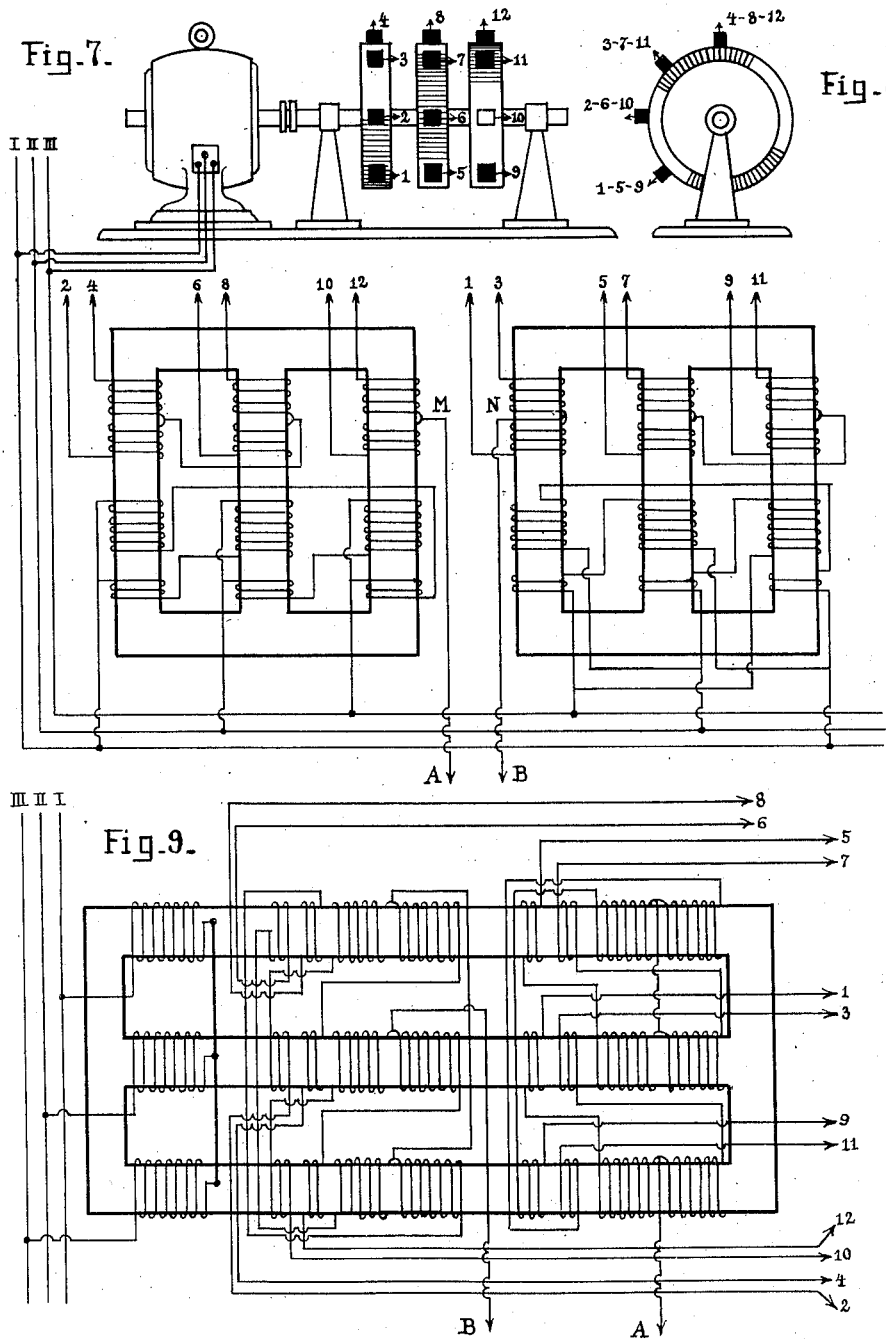
INVENTOR
Giovanni Melazzo
BY
ATTORNEY Patented Dec. 29, 1931

1,838,629

UNITED STATES PATENT OFFICE

GIOVANNI MELAZZO, OF NAPLES, ITALY

SYNCHRONOUS MOTOR-DRIVEN CONVERTER

Application filed October 30, 1928, Serial No. 316,071, and in Italy December 1, 1927.

The present invention concerns a device for the transformation of alternating current into direct current; the said device consists in a synchronous motor fed by the alternating current to be transformed into a direct current, and which serves to maintain in rotation a commutator which, through suitably arranged brushes, communicates successively and periodically with the several phases of the current to be transformed, the connections being effected in such manner that on the line to be fed, arrive, following and superposing each other, redressed half-waves, which give rise to a unidirectional pulsating current.

The amplitude of the pulsation may be diminished by increasing the number of the rectified half-waves of different phase, which are utilized in the same manner as it is done in the usual direct current dynamos. With this object in view, it is possible to make use of several commutators conveniently grouped together in such manner as to give systems of currents, the phases of which are displaced by the desired angle, and also of an auxiliary induction serving to attenuate the amplitude of said pulsation, all this being carried out in the manner which will be more particularly explained hereinafter with reference to the accompanying drawings, in which:

Figure 4:
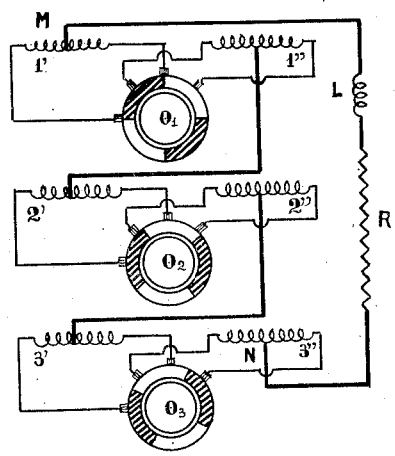
Fig. 4 shows the diagram of the connections in the case of the use of three commutators arranged in series and driven by the same motor.
Figure 5:
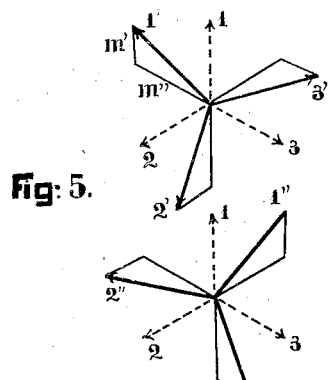
Fig. 5 shows the diagrams of the electromotive forces used for feeding the converter according to Fig. 4.

Fig. 7 illustrates the synchronous motor driving a system of three ring shaped commutators, the twelve brushes of which are to be connected to the secondaries of two three phase transformers in the manner indicated in Fig. 4 and the primaries of said transformers are zig-zag connected in the manner indicated in the diagram of Fig. 5. The brushes and transformer secondary leads are assumed to be connected as indicated by corresponding numerals.

Fig. 8 illustrates an end view of the ring shaped commutators of Fig. 7.

Fig. 9 illustrates a three phase transformer, the secondaries of which are zig-zag connected in the manner indicated by the diagram of Fig. 5 and the terminals of which are assumed to be connected to the brushes of Fig. 7 indicated with corresponding numerals.

Figure 1:
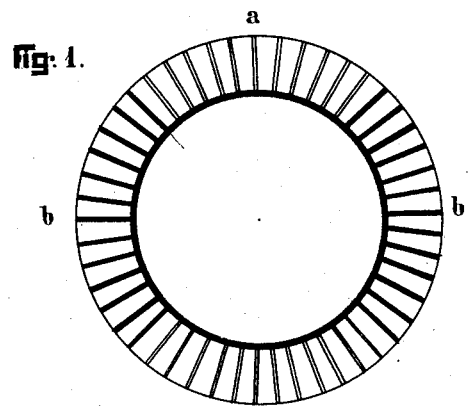
Figures 1 and 2 are respectively a front and a side view of the commutator alone.
Figure 2:
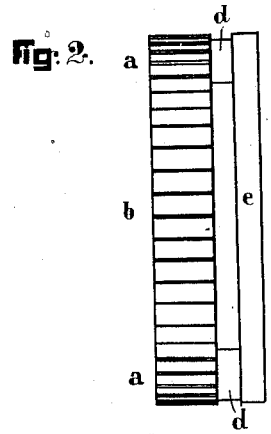

As will be seen from the drawings, the rotating commutator according to the present invention, is formed, Figures 1, 2, and 7, of a ring mounted on the shaft of the synchronous motor and shaped like an ordinary collector for direct current machines, but having a number N of bars, a multiple of the number $n$ of poles of the synchronous motor, so that, if the motor has $p$ pairs of poles, the number N must be a multiple of $2p$, expressed by $N=2pn$. In its formation between its bars are successively arranged $n+1$ insulating segments (like those used in the construction of dynamo collectors, for instance of mica) and $n-1$ copper segments of equal thickness as the preceding ones, so that the ring is formed of $2p$ parts, each comprising $n$ segments. Thus of these parts one, $b$, is insulated and formed of segments insulated among themselves, and the other $a$ is a conducting one and consists of segments in metallic contact, and these parts are alternately arranged on the said ring. At the side of this commutating ring is mounted a continuous metal ring $e$ (Fig. 2), which is fastened to the preceding one, resting on its conducting parts by means of $n$ metal flanges $d$ arranged between said rings. The object of these second rings is only to secure a metallic communication between the conducting parts of the first ring and it might therefore be substituted by any other metallic connection, for instance by soldering all the metallic segments of the conducting parts of the commutator to a continuous metallic ring which remains insulated from the metallic segments of the non-conducting parts.

On the periphery of this commutating ring —e— rest four brushes $s_1$, $s_2$, $s_3$, $s_4$ situated at the angular distance $$\frac{2\pi}{4p}$$

(45° in the case of $p=2$) (Fig. 3); the first and the third brushes $s_1$ and $s_3$ are connected to the terminals A and B of the secondary winding of a transformer, the second and the fourth brushes $s_2$ and $s_4$ to the terminals C and D of another secondary winding, which is the seat of an electromotive force equal and in quadrature to that which exists in the preceding one.

Figure 3:
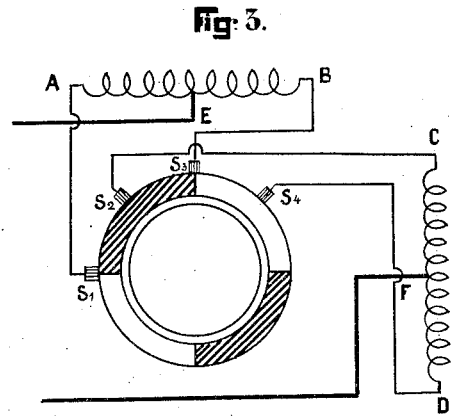
Fig. 3 shows the same commutator and its connections for the rectification and the conveyance of the alternating currents applied to it.

Fig. 3 has reference to the case of a synchronous four-pole motor, and in the ring of the commutator are indicated with continuous black lines the insulated parts $b$.

Upon arranging the brushes in such manner that they find themselves on the line which separates an insulated part from the subsequent conducting one of the commutator at the instant in which the corresponding electromotive force vanishes, between the middle points E and F of the secondary windings of the two transformers is obtained a pulsating difference of potential.

Fig. 4 has reference to the case of a commutator comprising three rings $O_1$, $O_2$, $O_3$, as that one of Fig. 3, which are keyed on the axis of the synchronous motor as shown in Fig. 7, that is always supposed to be tetrapolar, and rotated the one in respect to the other by an angle equal to $$\frac{2\pi}{3p},$$

calculating this rotation in respect to the separation line between an insulated part and a conducting part of the commutator rings.

The brushes corresponding to the three rings are supported by four arms situated at the angular distance of $$\frac{\pi}{2p}$$

on a single brush-holder and are completely insulated one from the other. The secondary windings of the transformers, connected to the brushes of a ring, must be seats of electromotive forces equal to but differing in phase by 120° from those belonging to the secondary windings connected with the contiguous commutating ring.

The three systems are connected in series as shown in Fig. 4, taking care, however, that all the commutated electromotive forces be concordant between each other.

In Fig. 7, the three conducting wires for the three phase current to be transformed and which also feed the synchronous motor, are indicated by numerals I, II and III. The terminals of the secondaries of the three phase transformers are designated by numerals which correspond to the brushes of the commutators to which they are connected. However this multitude of connections has not been shown because the illustration thereof would unnecessarily complicate and confuse the drawing. The distributing wires A and B carry the continuous current transformed in the apparatus to the desired place of utilization.

Between the terminals M N, between which is inserted the utilization circuit comprising a device adapted to operate on direct current and schematically represented in the drawings, see Fig. 4, by a resistance R, is obtained a slightly pulsating difference of potential of constant sign, with a frequency $12f$, if $f$ is that belonging to the alternating currents applied to the apparatus, which may give rise to a perfectly constant current if in the same circuit of utilization is arranged in series in the well known manner also a self inductance L of convenient value.

For feeding the arrangement shown by the diagram of Fig. 4 are required three systems of two-phase electromotive forces, differing in phase by 120°, which are equivalent to two three-phase systems in quadrature, and which may be easily obtained by utilizing a corresponding number of secondary windings of a conveniently formed three-phase transformer.

In order to achieve this object the three-phase transformer must contain in each phase two pairs of secondary windings whose number of turns $m'$ $m''$ have the ratio 0,366, grouped according to the diagram shown in Fig. 5 so as to give rise to 6 windings, seats of the electromotive forces 1' 2' 3' and 1'' 2'' 3'' which are connected with the brushes according to the diagram shown in Fig. 4. The three phase transformer and the arrangement of the windings thereof are shown in Fig. 9.

The same result may be obtained by utilizing the secondary windings of two three-phase transformers, whose primary windings, connected in parallel, are zig-zag shaped, having in each branch the number of turns arranged on different cores at the ratio 0,366, as indicated in the diagram of Fig. 5. The two three phase transformers thus connected to the three-phase feeding line and the arrangement of the windings thereof are illustrated in Fig. 7.

Figure 6:
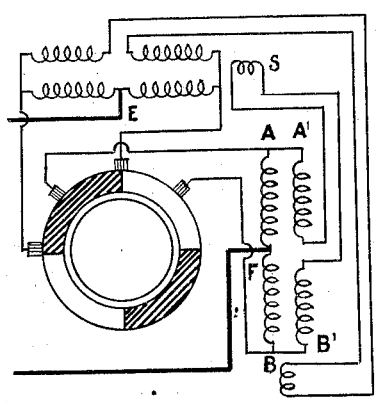
Fig. 6 shows the diagram of an arrangement adopted in connection with the commutators of the type already mentioned, in order to reduce the displacement of the brushes in dependence of the value of the commutated current.

With the increase of the value of the transformed current, the brush-holder must be conveniently rotated in the same direction as the motion of the commutator. A reduction of this displacement of the brushes is obtained however by the following arrangement of circuits. In parallel to each secondary winding A B connected to the brushes (Fig. 6) is arranged a circuit formed by another secondary winding A' B' identical to the preceding one, having in series a small number of turns S, seat of an electromotive force in quadrature in respect to that circulating in the aforesaid secondary windings so as to produce an alternating current in the short circuit formed by the two parallel systems. In Fig. 6 the diagram of this device is reproduced for a single commutator ring.

What I claim and desire to secure by United States Letters Patent is:

1. In an apparatus for converting polyphase alternating current into direct current, in combination, a synchronous motor energized by said polyphase alternating current, a rotating commutator driven by said motor, a transformer having the primary windings thereof also energized by said polyphase alternating current, said rotating commutator comprising a ring having alternate conducting and insulating sectors, the number of pairs of said conducting and insulating sectors corresponding to the number of pairs of poles of said synchronous motor and conducting means connected to said conducting sectors, two pairs of brushes engaging said ring, said brushes being connected to the secondary windings of said transformer and annularly displaced from each other by an angle equal to the angular phase difference in said secondary windings and also equal to the arc of said conducting sectors.

2. In an apparatus for converting polyphase alternating current into direct current, in combination, a synchronous motor energized by said polyphase alternating current, a rotating commutator driven by said motor, a transformer having the primary windings thereof also energized by said polyphase alternating current, said rotating commutator comprising a ring having alternate conducting and insulating sectors, the number of pairs of said insulating and conducting sectors corresponding to the number of pairs of poles of said synchronous motor, a plurality of conducting and alternate insulating segments constituting said insulating and conducting sectors in laminated form and conducting means connected to said conducting segments of said conducting sectors, two pairs of brushes engaging said ring, said brushes being connected to the secondary windings of said transformers and annularly displaced from each other by an angle equal to the angular phase difference in said secondary windings and also equal to the arc of said conducting sectors.

3. In an apparatus for converting polyphase alternating current into direct current, in combination, a synchronous motor energized by said polyphase alternating current, a plurality of rotating commutators driven by said motor, the number of said rotating commutators corresponding to the pairs of phases in quadrature in said polyphase alternating current, a transformer having the primary windings thereof also energized by said polyphase alternating current, each of said rotating commutators comprising a ring having alternate conducting and insulating sectors, the number of pairs of said conducting and insulating sectors corresponding to the number of pairs of poles of said synchronous motor and conducting means connected to said conducting sectors, two pairs of brushes engaging each of said rings, said brushes being connected to the secondary windings of said transformer and annularly displaced from each other by an angle equal to the angular phase difference in said secondary windings and also equal to the arc of said conducting sectors.

4. In an apparatus for converting three phase alternating current into direct current, in combination, a synchronous motor energized by said alternating current, three rotating commutators driven by said motor, a three phase static transformer comprising three primary and three pairs of secondary windings having twelve terminals also energized by said three phase alternating current, each of said rotating commutators comprising a ring having alternate conducting and insulating sectors, the number of pairs of said conducting and insulating sectors corresponding to the number of pairs of poles of said motor and conducting means connected to said conducting sectors, two pairs of brushes engaging each of said rings, said brushes being connected to said twelve terminals of said pairs of secondary windings to form two three phase alternating currents in quadrature and being annularly displaced from each other by an angle equal to the angular phase difference in said secondary windings and also equal to the arc of said conducting sectors.

5. In an apparatus for converting three phase alternating current into direct current, in combination, a synchronous motor energized by said three phase alternating current, three rotating commutators driven by said motor, two three phase static transformers each comprising three primary windings zigzag connected and three secondary windings having twelve terminals also energized by said three phase alternating current, each of said rotating commutators comprising a ring having alternate conducting and insulating sectors, the number of pairs of said conducting and insulating sectors corresponding to the number of pairs of poles of said motor and conducting means connected to said conducting sectors, two pairs of brushes engaging each of said rings, said brushes being connected to said twelve terminals of said secondary windings to form two three phase alternating currents in quadrature and being annularly displaced from each other by an angle equal to the angular phase difference in said secondary windings and also equal to the arc of said conducting sectors.

6. In an apparatus for converting polyphase alternating current into direct current, in combination, a synchronous motor energized by said polyphase alternating current, rotating commutators driven by said motor, a transformer having the primary windings thereof also energized by said polyphase alternating current, said rotating commutators each comprising a ring having alternate conducting and insulating sectors, the number of pairs of said conducting and insulating sectors corresponding to the number of pairs of poles of said motor and conducting means connected to said conducting sectors, two pairs of brushes engaging each ring, said brushes being connected to the secondary windings of said transformer and annularly displaced from each other by an angle equal to the angular phase difference in said secondary windings and also equal to the arc of said conducting sectors, and adjusting means for varying the displacement necessary for said brushes depending on the load comprising a second secondary winding connected in parallel with one phase of the aforementioned transformer secondary winding and a winding connected in series therewith, positioned in inductive relation to another phase of said secondary winding.

In testimony whereof I have affixed my signature this 16th day of October, 1928.

GIOVANNI MELAZZO.